United States Patent Office 3,303,092
Patented Feb. 7, 1967

3,303,092
1-SUBSTITUTED 2,6-DIHALO PHENYL HYPNOTIC AND ANALGESIC
Donald E. Stevenson, Herne Bay, Kent, England, assignor to Shell Oil Company, New York, N.Y., a corporation of Delaware
No Drawing. Filed June 17, 1963, Ser. No. 288,502
Claims priority, application Great Britain, June 29, 1962, 25,075/62
7 Claims. (Cl. 167—52)

This invention relates to a method for controlling metabolic processes, particularly for depressing metabolic processes, and especially for the control of pain. The invention provides novel pharmaceutical compositions useful as metabolic depressants, with particular value as hypnotics and as analgesics.

It has been discovered that compounds of the formula following are powerful general metabolic depressants, with hypnotic and analgesic properties, yet are not toxic to animals at the effective dosages and are not known to have undesirable side-effects. These compounds have the formula:

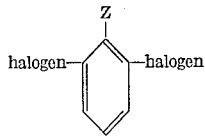

and salts thereof, wherein

"halogen" represents middle halogen—that is, chlorine or bromine;
Z represents cyano, oxime (—CH=NOH), alpha-aminooxime (—C(amino)=NOH), wherein "amino" is the amino radical, an alkyl-amino radical of from 1 to 4 carbon atoms or a dialkylamino radical in which each alkyl contains 1 to 4 carbon atoms and thioamide (—C(S)(NH₂)).

The salts suitable of the aforesaid compounds may be salts formed with bases or acids according as there are acidic groups, for example, the oxime group =NOH, or basic groups, for example amino and substituted amino groups, respectively, present in the molecule. Where there are no acidic or basic groups, salts will not normally be formed. The preferred salts are the alkali metal, particularly sodium salts, and ammonium and amine salts, especially the diethylamine and triethylamine salts and the mono-, di- and tri-alkanolamine salts, particularly the mono-, di- and tri-ethanolamine salts, and salts of heterocyclic nitrogenous bases, for example pyridine. Compounds containing basic groups may form salts with organic or inorganic acids, for example, hydrochloric, hydrobromic, sulphuric, phosphoric, nitric, maleic, fumaric, citric, tartaric, methane sulphonic or ethane disulphonic acids.

From the available evidence, it appears that certain genera of this class of compounds are particularly valuable as metabolic depressants. Preferred subgenera are those wherein:

(a) Z is cyano—that is, this subgenus consists of the 2,6-di(middle-halo)benzonitriles, of which 2,6-dichlorobenzonitrile is most preferred;

(b) Z is oxime of the formula —CH=NOH, that is, this subgenus consists of the 2,6-di(middle halo)benzaldoximes, of which 2,6-dichlorobenzaldoxime is most preferred;

(c) Z is alpha-aminooxime of the formula

—C(amino)=NOH wherein "amino" is the amino radical, an alkylamino radical of from 1 to 4 carbon atoms or a dialkylamino radical in which each alkyl contains from 1 to 4 carbon atoms, those wherein "amino" is the amino radical (—NH₂) being particularly preferred, while alpha-amino-2,6-dichlorobenzaldoxime is most preferred;

(d) Z is thioamide of the formula —C(S)(NH₂), with 2,6-dichlorothiobenzamide being most preferred.

Typical species of these compounds include:

2,6-dichlorobenzonitrile;
2-chloro-6-methylbenzonitrile;
2-chloro-6-ethylbenzonitrile;
2,6-dichlorobenzaldoxime;

alkali metal salts alpha-allylamino-2,6-dichlorobenzaldoxime;
alpha-methylamino-2,6-dichlorobenzaldoxime;
alpha-dimethylamino-2,6-dichlorobenzaldoxime;
alpha-isobutylamino-2,6-dichlorobenzaldoxime;
alpha-amino-2-chloro-6-bromobenzaldoxime;
alpha-amino-2-methyl-6-chlorobenzaldoxime;

and the salts of the above basic substituted benzaldoximes with acids, particularly with the acids hereinbefore specified, 2,6-dichlorothiobenzamide, 2-chloro-6-bromothiobenzamide, and the alkali metal, pyridine, amine and alkanolamine salts of said thiobenzamides; and analogues of the foregoing compounds wherein one or each chlorine atom is replaced by bromine.

The compounds of the general formula hereinbefore specified, and the specific examples given above, depress the spontaneous activity of isolated smooth muscle tissue suspended in a Krebs-Ringer bicarbonate solution, the most active compounds being alpha-amino-2,6-dichlorobenzaldoxime; alpha-amino-2,6-dichlorobenzaldoxime hydrochloride; 2,6-dichlorothiobenzamide and 2,6-dichlorobenzonitrile.

The results are summarized in the following table in the section headed "In vitro Experiments."

Alpha-amino-2,6-dichlorobenzaldoxime hydrochloride as a 10% wt. solution in water reduced the oxygen consumption of rats by up to 50% when an intraperitonal dose of 200 to 250 milligrams per kilogram body weight was given. The pain threshold and the activity of the central nervous system was simultaneously depressed. Each of the four compounds listed above also produced narcosis in rats following an acute oral dose of a 10% w./v. solution of the compound in dimethyl sulphoxide approaching the lethal range. Symptoms appeared within 2 to 3 minutes and even before consciousness was lost, the animal became unresponsive to painful stimuli. The alpha-amino-2,6-dichlorobenzaldoxime and its hydrochloride were the most active compounds and were approximately equal in activity. The thiobenzamide was somewhat less active. Further tests carried out on similar lines established that 2,6-dichlorobenzonitrile had approximately the same order of activity as 2,6-dichlorobenzaldoxime which was more active than its sodium salt.

Similar effects were obtained with fasting rats by intra-gastric injection with a ball-point needle of the following compositions containing the above compounds.

2,6-dichlorobenzonitrile:
   10% w./v. solution in dimethylsulphoxide
   14% w./v. solution in dimethylsulphoxide
   20% w./v. suspension in aqueous sodium carboxymethyl cellulose containing 1% wt. of the cellulose derivative Alpha-amino-2,6-dichlorobenzaldoxime: 10% w./v. solution in dimethylsulphoxide Alpha-amino - 2,6-dichlorobenzaldoxime hydrochloride: 10% w./v. solution in distilled water 2,6 - dichlorothiobenzamide: 10% w./v. solution in dimethyl sulphoxide In these tests, the acute oral toxicity $LD_{50}$ to rats was found to be:

| | $LD_{50}$ (milligrams/kilogram of body weight) |
|---|---|
| 2,6-dichlorobenzonitrile | >3,000 |
| Alpha-amino-2,6-dichlorobenzaldoxime | 380 |
| Alpha-amino-2,6-dichlorobenzaldoxime hydrochloride | 749 |
| 2,6-dichlorothiobenzamide | 757 |

Animals which had been dosed with the amino compound or its hydrochloride or with the thiobenzamide remained unconscious for 5 to 10 hours depending on the dose rate and within 24 hours exhibited a normal degree of activity. The effects of the nitrile were more prolonged, lasting some 15 to 24 hours, but the animals exhibted a normal degree of activity within 48 hours.

Further tests carried out with alpha-amino - 2,6 - dichlorobenzaldoxime hydrochloride showed that when administered to rats by intraperitoneal injection at dosages of 250 milligrams per kilogram body weight, a state of anaesthesia resulted under which it was possible to carry out abdominal surgery. Moreover, the degree of muscle relaxation obtained was of a similar order to that obtained with a standard muscle relaxant though the mechanism is not the same and the effects can best be described by the terms hypnosis and analgesia, i.e. similar to those produced by such drugs as morphine and pethidine. Administration to rabbits, dogs and cats by intravenous and intraperitoneal injection indicated that similar effects are produced in these species. Thus, in one dog, intravenous injection of 30 milligrams per kilogram body weight produced a state of analgesia sufficient to remove a cutaneous granuloma although the animal was still conscious. The dog was able to walk within 60 minutes. The effects obtained have proved very consistent. A particularly useful application of the composition of the invention is in the treatment of ruminants where it is feasible to undertake surgery without the hazard of regurgitation of ruminal contents.

Administration of alpha-amino-2,6-dichlorobenzaldoxime hydrochloride as a 5% by weight solution in physiological saline produced rapid sleep in rats, rabbits and in a dog and cat, when given by intravenous, intra-peritoneal, sub-cutaneous or intra-muscular injection. A dose rate of about 100 milligrams per kilogram body weight by any of these routes produced rapid sleep, but lower does rates appeared to inhibit a response to painful stimuli. Recovery from an oral dose took 12 to 24 hours whereas parenteral administration produced a more rapid response and the animal was fully recovered in 2 to 3 hours. These compounds are therefore particularly useful as analgetics and hypnotics. Since they depress the metabolic rate, they are also useful in cooling body temperatures in hyperthermia and in producing sub-normal body temperatures.

In the following table are summarized the results of experiments such as described above to determine the effect of 2,6 - dichlorobenzonitrile, alpha-amino-2,6-dichlorobenzaldoxime hydrochloride and of 2,6-dichlorothiobenzamide, in the compositions specified, on specific body functions and in vitro experiments to determine the effect of those compounds on isolated tissues and organs.

TABLE I

IN VIVO EXPERIMENTS

| | 2,6-dichlorobenzonitrile | Alpha-amino-2,6-dichlorobenzaldoxime hydrochloride | 2,6-dichlorothiobenzamide |
|---|---|---|---|
| | Solubility in water | | |
| | 20 p.p.m. | 70% w. | 763 p.p.m. |
| | pH of solution | | |
| | Neutral (saturated solution) | pH 2.3 for 10% w. solution | Neutral (saturated solution) |
| | RAT | RAT | RAT |
| Blood pressure | Dose: 100 mg./kg. of body weight (b.w.) in dimethyl sulphoxide. Fall from 140 to 115 mm. Hg in period between 2 and 3 hours after injection. | Dose: 200 mg./kg. b.w. in water. Transient fall of 20 to 30 mm. Hg during period of anaesthesia induced by this compound lasting 2 to 3 hours. | Dose: 100 mg./kg. b.w. in dimethyl sulphoxide. Slight transient rise of 10 to 20 mm. Hg. Two further doses of 200 mg./kg. after 75 minute intervals caused 20 mm. Hg fall. |
| Electrocardiogram | No significant effect | No significant effect | No significant effect. |
| Heart rate | do | Transient slowing down e.g. 210 to 170 beats per minute. | Do. |
| Respiration | Slows down slightly from 60 to 50 breaths (in+out) per minute from 2 to 3 hours after injection, then restores to normal. | No change in rate but depth decreased. | No change. Depressed by dose of 400 gm./kg. b.w. (e.g. from 84 to 68 per minute). |
| Oxygen uptake | Not measured | Dose of 250 mg./kg. b.w. causes ca. 50% depression lasting 2 to 3 hours. Dose of 200 mg./kg. b.w. causes ca. 20% depression lasting 1½ to 2 hours. | Not measured. |
| $CO_2$ output | do | Dose of 250 mg./kg. b.w. causes 40% depression lasting 2 to 3 hours. Dose of 200 mg./kg. b.w. causes ca. 20% depression lasting 1½ to 2 hours. | Do. |
| | | RABBIT | |
| Body temperature | do | Dose of 100 mg./kg. causes a transient fall of 1° C. between 60 and 90 minutes after injection. Dose of 200 mg./kg. causes a transient fall of 1.4° C. between 105 and 120 minutes after injection. | Do. |

TABLE I—Continued

IN VIVO EXPERIMENTS—Continued

| | 2,6-dichlorobenzonitrile | Alpha-amino-2,6-dichlorobenzaldoxime hydrochloride | 2,6-dichlorothiobenzamide |
|---|---|---|---|
| | \multicolumn{3}{c}{Solubility in water} | | |
| | 20 p.p.m. | 70% w. | 763 p.p.m. |
| | \multicolumn{3}{c}{pH of solution} | | |
| | Neutral (saturated solution) | pH 2.3 for 10% w. solution | Neutral (saturated solution) |
| Diuresis | Not measured | RABBIT Dose of 100 mg./kg. b.w. causes a kidney "shut-down" between 60 and 105 minutes after injection, when normal diuresis is restored. RAT Dose of 100 mg./kg.-water hour clearance unimpaired over a 24 period except for a 70% fall in diuresis during first few hours after injection. Mercurial diuretics are not effective during the period of diminished diuresis. | Not measured. |
| Reflexes: | | | |
| Vagal reflex | Unimpaired | Unimpaired | Unimpaired. |
| Carotid occlusion | do | do | Do. |
| Drug response: | | | |
| To acetylcholine | No change | Slightly diminished after dose of 100 mg./kg. | No change. |
| To adrenaline | do | do | Do. |

IN VITRO EXPERIMENTS PERFORMED WITH AQUEOUS SOLUTIONS OF THE CONCENTRATIONS STATED

| | 2,6-dichlorobenzonitrile | | Alpha-amino-2,6-dichlorobenzaldoxime hydrochloride | | 2,6-dichlorothiobenzamide | |
|---|---|---|---|---|---|---|
| | \multicolumn{6}{c}{Solubility in water} | | | | | |
| | 20 p.p.m. | | 70% w. | | 763 p.p.m. | |
| | \multicolumn{6}{c}{pH of solution} | | | | | |
| | Neutral (saturated solution) | | pH 2.3 for 10% w. solution | | Neutral (saturated solution) | |
| | Conc, p.p.m. | Effect | Conc, g./mg. | Effect | Conc, g./mg. | Effect |
| SMOOTH MUSCLE | | | | | | |
| Guinea pig ileum | 20 | Spasmolysis; feeble response to acetylcholine after contact for 2 minutes; diminution in barium chloride induced contractions. Responses restored to normal by washing in Krebs' solution. | 4×10⁻⁵ | Spasmolysis; contractions induced by nicotine, acetylcholine and histamine are abolished. Responses restored to normal by washing in Krebs' solution. | 7.5×10⁻⁴ | Spasmolysis abolished contractions induced by acetylcholine and barium chloride. Responses restored to normal by washing in Krebs' solution. |
| Rabbit small intestine | 20 | Spasmolysis | 4×10⁻⁵ | Spasmolysis | 7.5×10⁻⁴ | Spasmolysis. |
| Rabbit uterus | 20 | do | 4×10⁻⁵ | do | 7.5×10⁻⁴ | Do. |
| Guinea pig vas deferens | 20 | Not significantly affected | 4×10⁻⁵ | Diminished response to adrenaline. | 2×10⁻⁴ | 45% decrease in response to adrenaline after contact for 5 minutes. |
| STRIATED MUSCLE | | | | | | |
| Muscle—Neuro-muscular junction. | 20 | Not effected | 10⁻⁴ | Rapidly diminished response; washing in Krebs' solution restores to normal. | 10⁻⁴ | Rapidly diminished response; washing in Krebs' solution restores to normal. |
| Heart: Rabbit isolated | 20 | Prefusion showed slightly decreased output. | 2.5×10⁻⁴ | Perfusion showed no change. | 10⁻⁴ | Perfusion shosed no change. |
| Circulation: Isolated rabbit ear. | 20 | Initially perfusion caused slight vasodilatation. | 2.5×10⁻⁴ | No appreciable effect | 10⁻⁴ | Perfusion causes slight dilatation; prolonged response to adrenaline. |

The preferred compounds to use in the compositions of the invention are alpha-amino-2,6-dichlorobenzaldoxime and its salts, particularly the hydrochloride 2,6-dichlorothiobenzamide and 2,6-dichlorothiobenzaldoxime and its sodium salt.

The compositions according to the present invention also comprise a pharmaceutical carrier which may be either a solid material or a liquid. Preparations for oral ingestion can be liquids or solids or any combination of these forms, such as syrups, elixirs, powders or tablets. Preparations for administration of the active agent in unit dose form can take the form of compressed powders or tablets or of a powder enclosed in a suitable capsule of absorbable material such as gelatin. The compressed powders or tablets may also comprise suitable excipients and/or diluents such as starch, lactose, stearic acid, magnesium stearate, dextrin or polyvinyl pyrrolidone.

Preparations for parenteral administration may be sterile solutions or suspensions in liquids such as water, physiological saline, benzyl alcohol or ethyl oleate and may contain soluble or insoluble diluents and/or solid or liquid excipients.

The unit dosage or therapeutically effective quantity of the metabolism control agents of this invention for therapeutic uses described herein can vary over wide limits. In some cases, as little as 25 milligrams of the active material per kilogram of body weight can be effective, as in the reduction of pain, or in effecting sedation, while seldom will a dosage in excess of about 250 milligrams per kilogram of body weight be required. In general, for oral administration, the effective dosage will be from about 100 to about 200 milligarms per kilogram of body weight, while for parenteral administration, the effective dosage will be from about 25 to about 100 milligrams per kilogram of body weight. Each dosage unit form—each capsule, tablet, ampoule, syrette or prescribed dose—can contain from about 1 percent to about 95 percent of active material, based upon the total weight of the formulation, and preferably contains from about 2.5 percent to about 50% of the active material, on the same basis. Of course, it is possible to administer the therapeutics without the use of a pharmaceutical carrier. The therapeutic agents of this invention can be administered either prior to or after the onset of the condition to be treated, such as when they are used as: analgesics for the amelioration of pain such as the common headache, mild rheumatism and the like; antipyretics to reduce fever or simply to lower the body temperature; motor depressants or tranquilizers to relieve nervous tension, hyperexcitability and induce sedation; anti-inflammatory agents for edematous conditions such as are caused by arthritis; or as anesthetics for control of pain and/or to relieve muscle tension during an operation.

The invention is illustrated by the following examples of suitable therapeutic compositions in unit dosage form, although it is not intended that the compositions or dosages be limited by any of the proportion, amounts, types or carriers, or dosage units set forth therein.

*Example I*

A solution for injection comprising alpha-amino-2,6-dichlorobenzaldoxime hydrochloride, 5 grams, and distilled water up to 100 milliliters, was prepared by dissolving the hydrochloride in the distilled water, filtering the solution, filling into ampoules and then sterilizing the ampoules in an autoclave.

Similarly, an injectable solution was prepared comprising the sodium salt of 2,6-dichlorobenzaldoxime monohydrate as the active ingredient.

*Example II*

Tablets comprising

|  | Milligrams |
|---|---|
| 2,6-dichlorothiobenzamide | 2.5 |
| Maize starch | 10.0 |
| Lactose | 82.3 |
| Stearic Acid | 5.0 |
| Sodium carboxymethyl cellulose | 0.2 | were made by dispersing the sodium carboxymethyl cellulose in water, mixing this dispersion with the other ingredients except the stearic acid, passing the resulting mixture through a 12 mesh British standard sieve, drying overnight at 70° C., then mixing with the stearic acid and compressing into tablets.

*Example III*

Tablets comprising

|  | Milligrams |
|---|---|
| 2,6-dichlorobenzonitrile | 10.0 |
| Lactose | 45.5 |
| Starch | 24.0 |
| Dextrin | 20.0 |
| Magnesium stearate | 0.5 | were prepared by mixing the ingredients, other than the magnesium stearate, intimately together, passing the mixture through a 60-mesh British standard sieve. After addition of the magnesium stearate, the mixture was granulated and the granules then compressed into tablets.

I claim as my invention:

1. A method of inducing analgesic and hypnotic effects in animals which comprises administering to an animal in pain an effective dosage of a member of the group consisting of a compound of the formula:

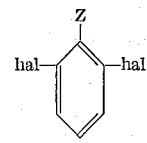
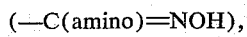

and pharmaceutically acceptable salts thereof, wherein Z represents a member of the group consisting of cyano, oxime (—CH=NOH), aplha-aminooxime (—C(amino)=NOH), and thioamide (—C(S)(NH$_2$)); hal represents a member of the group consisting of chlorine and bromine.

2. A method of inducing analgesic and hypnotic effects in animals which comprises administering from about 25 milligrams per kilogram of body weight to about 250 milligrams per kilogram of body weight to an animal in pain of a member of the group consisting of a compound of the formula:

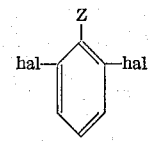
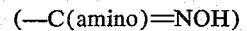

and pharmaceutically acceptable salts thereof, wherein Z represents a member of the group consisting of cyano, oxime (—CH=NOH), alpha-aminooxime (—C(amino)=NOH)

and thioamide (—C(S)(NH$_2$)); hal represents a member of the group consisting of chlorine and bromine.

3. A method of inducing nalgesic and hypnotic effects in animals which comprises administering to an animal an effective dosage of 2,6-dichlorobenzaldoxime.

4. A method of inducing analgesic and hypnotic effects in animals which compries administering to an animal an effective dosage of alpha-amino-2,6-dichlorobenzaldoxime.

5. A method of inducing analgesic and hypnotic effects in animals which comprises administering to an animal an effective dosage of apha-amino-2,6-dichlorobenzaldoxime hydrochloride.

6. A method of inducing analgesic and hypnotic effects in animals which comprises administering to an animal an effective dosage of 2,6-dichlorothiobenzamide.

7. A method of inducing analgesic and hypnotic effects in animals which comprises administering to an animal in pain an effective dosage of 2,6-dichlorobenzonitrile.

References Cited by the Examiner

UNITED STATES PATENTS

| 2,671,798 | 3/1954 | Chamberlin | 260—465 |
| 3,129,240 | 4/1964 | Hartstra | 260—465 |
| 3,129,260 | 4/1964 | Yates | 260—566 |

(Other references on following page)

FOREIGN PATENTS 862,863  3/1961  Great Britain.
908,964  10/1962  Great Britain.

OTHER REFERENCES

Chem. Abst., vol. 58, p. 3362, February 1962, Belgium 612,252.

Derwent: Derwent Belgian Report, No. 68B, C-3, Oct. 18, 1960, citing Belgian 587,164.

Derwent: Derwent Belgian Report, No. 76-A, C-13, citing Belgian 594,573, May 6, 1961.

Derwent: Derwent Belgian Patent Reports, No. 79A, C-14, Oct. 10, 1961, citing Belgian 598,730.

Derwent: Derwent Belgian Reports, No. 91B, 5, General Organic, page 1 (For. Pat. JR 1).

Gass: J. Am. Pharm. Assoc., Sc. Ed., XLVIII, No. 3, March 1959, page 186.

Nature, London, volume 186, pages 89–90, April 2, 1960.

Science, Science News Letter, April 16, 1960, p. 249, vol. 77–78.

JULIAN S. LEVITT, *Primary Examiner.*

FRANK CACCIAPAGLIA, JR., *Examiner.*

P. L. SABATINE, JEROME D. GOLDBERG,
*Assistant Examiners.*